Oct. 19, 1954  B. N. ASHTON ET AL  2,691,990
SELECTOR VALVE

Filed July 31, 1952  2 Sheets-Sheet 1

INVENTORS.
BENJAMIN N. ASHTON
JOHN P. FRAIN
BY
THEIR ATTORNEYS.

Oct. 19, 1954  B. N. ASHTON ET AL  2,691,990
SELECTOR VALVE
Filed July 31, 1952  2 Sheets-Sheet 2

INVENTORS.
BENJAMIN N. ASHTON
JOHN P. FRAIN
BY
THEIR ATTORNEYS.

Patented Oct. 19, 1954

2,691,990

UNITED STATES PATENT OFFICE 2,691,990

SELECTOR VALVE

Benjamin N. Ashton and John P. Frain, Kingston, N. Y., assignors to Electrol Incorporated, Kingston, N. Y., a corporation of Delaware Application July 31, 1952, Serial No. 301,934

7 Claims. (Cl. 137—622)

This invention relates to improvements in poppet type valves and it relates particularly to improvements in poppet type valves and in four-port selector valves of the type disclosed generally in the Ashton U. S. Patent No. 2,349,069, dated May 16, 1944.

The selector valve and poppet valve unit used therein as disclosed in the Ashton Patent No. 2,349,069 has proved highly successful for use in hydraulic power transmitting systems such as for example, aircraft hydraulic systems for projecting and retracting landing gear and actuating landing flaps and the like. Recent developments in such hydraulic systems resulting in greater complexity of the systems has, however, placed great emphasis upon reduction of size of the component parts, such as the valves of the hydraulic system while at the same time requiring the valves to function properly under conditions of increasingly great pressure, in some instances as high as 3,000 lbs. per square inch. Due to the demand for smaller or more compact valves capable of handling the same or greater volumes of liquid at greatly increased pressures, increasing difficulties have been encountered in providing the proper porting and arrangement of passages in the valves to permit the flow of the fluid freely through the valve. Due to the demands indicated above, we attempted to overcome the difficulty of machining the ports and drilling the small passages in a balanced valve of the type disclosed in the Ashton Patent No. 2,349,069 by inverting the individual poppet valves so that the poppet heads are disposed adjacent to and engage the actuating member or cam shaft of the valve by means of which the poppet heads are moved selectively into and out of engagement with the valve seats. It was found that such a change could not be made in the prior type of valve because the parts had to be machined to impractically close tolerances in order to assure seating of the poppet head when the valve is in its closed position. In other words, unless the actuating member or cam shaft, the valve seats and the thickness of the valve heads are made to almost zero tolerances the cam could not move the poppet head into contact with the valve seat without exerting such pressure as to damage the head or the seat. It then occurred to us that the need for manufacturing the various elements of the valve to the impractical tolerances referred to above could be overcome by mounting the seat of the valve so that it can move slightly and thereby compensate for the inaccuracies of manufacture while at the same time maintaining a leak-proof seal between the valve head and the seat.

The present invention contemplates the provision of an inverted valve unit, and a selector valve including a plurality of such units, in which the seat for a poppet type valve is movably mounted to enable a tight seal to be obtained between the seat and the poppet head while at the same time permitting the poppet to be displaced from the seat a predetermined distance to thereby permit flow of the liquid or other fluid through the valve.

For a better understanding of the present invention, reference may be had to the accompanying drawing in which.

The invention will be described in connection with lightweight four-port, four-valve selector valve of a type suitable for use in aircraft. It will be understood, however, that the valve may take other forms and the arrangement of the valve units described hereinafter may be modified as the purpose demands.

Figure 1:
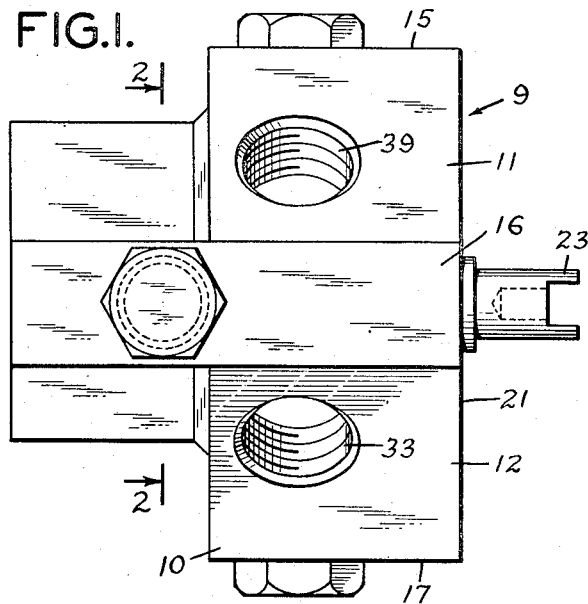
Fig. 1 is a view in side elevation of a typical valve embodying the present invention.
Figure 2:
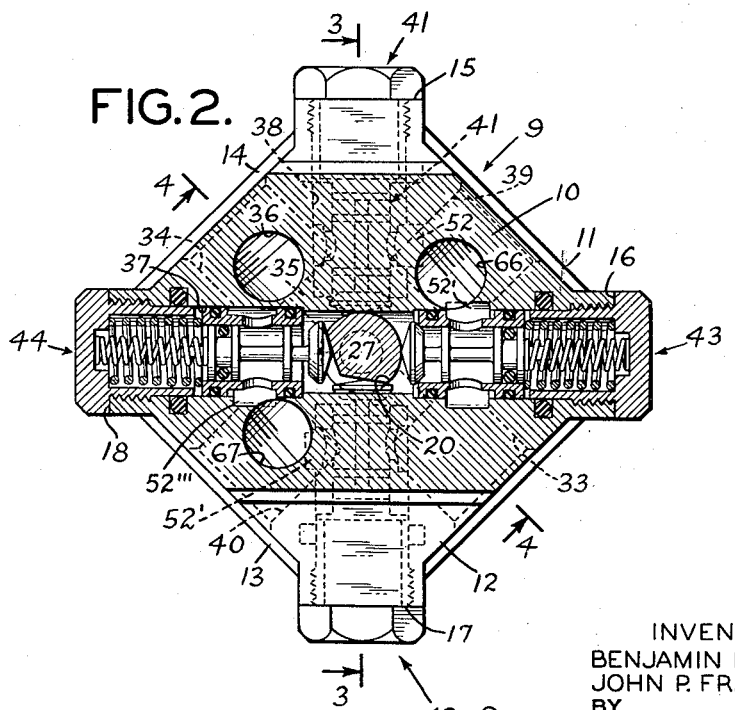
Fig. 2 is a view in section taken on line 2—2 of Fig. 1.

Referring now to Figs. 1 and 2 of the drawing, the valve may include a casing 9 including a portion 10, as shown in Fig. 2 of generally octagonal outline having four long sides 11, 12, 13 and 14 and interposed narrower sides 15, 16, 17 and 18. The casing 9 also has a laterally projecting casing portion 19 extending from one side of the octagonal portion 10 of the casing.

Figure 4:
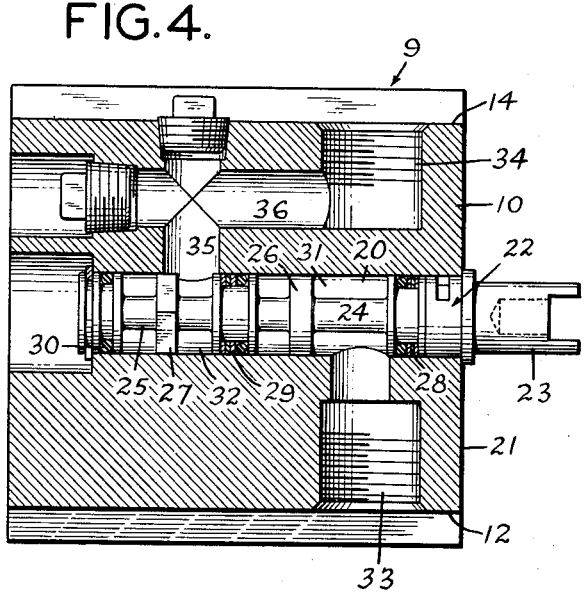
Fig. 4 is a view in section on line 4—4 of Fig. 2.
Figure 3:
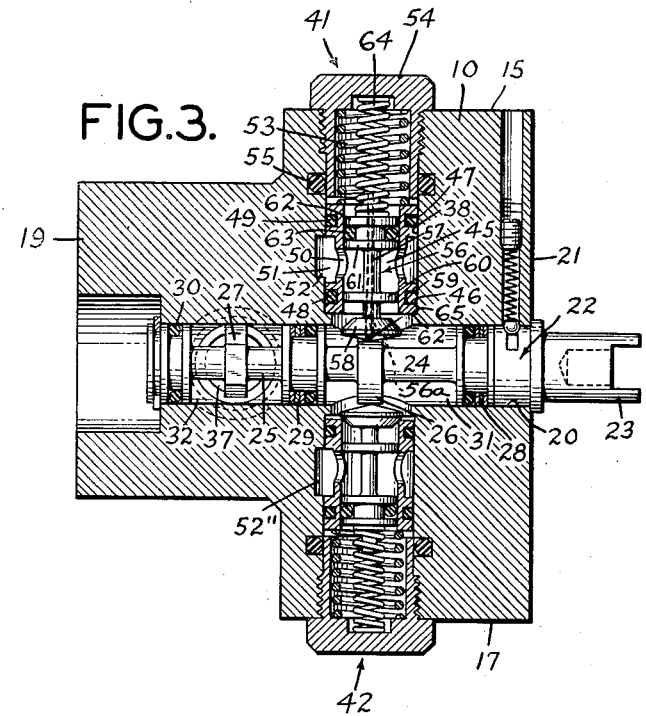
Fig. 3 is a view in section taken on line 3—3 of Fig. 2.

As shown in Figs. 2, 3 and 4, the casing 9 has a centrally located bore 20 which extends lengthwise into the casing section 19 through the flat outer face 21 of the portion 10. The bore 20 receives rotatably a cam shaft member 22 which has a projecting end 23 on which may be mounted an operating lever or knob, not shown.

The cam shaft 22 has two spaced apart, narrow shaft portions 24 and 25 which carry, respectively, the operating cams 26 and 27. Interposed between the shaft portions 24 and 25 and at opposite ends thereof are the seals 28, 29 and 30 which prevent leakage of liquid past the ends of the cam shaft 22 and between the chambers 31 and 32 between the respective seals 28 and 29 and 29 and 30. As best shown in Fig. 4, the chamber 31 is supplied with liquid under pressure by means of a pressure port 33 which may be connected to a pump or the like and opens through the wide wall 12 of the casing portion 10.

The chamber 32 is connected with a return port 34 by means of a radial passage 35 (Fig. 4) having a plugged outer end and a longitudinally extending passage 36 also having a plugged left-hand end as viewed in Fig. 4. The return port 34 is located in the wall 14 of the casing portion 10.

The casing 9 also has a pair of transverse bores 37 and 38 in the portions 19 and 10, respectively, which intersect the passage or bore 20 at substantially right angles to it and which are disposed at substantially right angles to each other but spaced apart lengthwise of the bore 20 to communicate with the chambers 32 and 31 respectively. Each of the bores 37 and 38 is provided with a pair of opposed poppet valve units on opposite sides of the cam shaft 22 which regulate or control the flow of liquid from the pressure port 33 to a pair of connection ports 39 and 40 located in the walls 11 and 13, respectively, of the casing, in a manner to be described hereinafter.

The poppet valve units 41, 42, 43 and 44 used in the selector valve are all alike and only one of them will be described herein. As shown in Fig. 3, the poppet valve unit 41, for example, includes a hollow sleeve 45 which is slidably mounted in the upper end of the bore 38 to one side of the bore 20. The sleeve 45 is of smaller diameter than the bore 38 and is provided with outwardly extending flanges providing the grooves 46 and 47 adjacent its opposite ends to receive sealing rings 48 and 49 which prevent leakage around the outside of the sleeve. Between the ends of the sleeve are one or more openings 50 through which liquid can flow from the interior of the sleeve into the space 51 between its ends and into the recess 52 formed in the wall of the casing adjacent the bore 38.

The sleeve 45 is normally urged inwardly toward the bore 20 by means of a spring 53 which engages its upper end and also engages the inner surface of a closure cap or thimble 54 which is threaded into the upper threaded end of the bore 38 to close it and prevent leakage from the casing. A sealing ring 55 may be interposed between the cap 54 and the wall of the bore 38 to prevent leakage around the outside of the cap.

Cooperating with the sleeve 45 is a valve member 56 having a valve stem 57 and a poppet head 58 thereon. The valve member 56, as illustrated, is of the cone poppet type. The head 58 cooperates with the inner edge 59 of the sleeve 45 which forms a seat for the valve. The valve stem 57 has an interrupted or non-circular flange 60 thereon spaced inwardly from the poppet head 58 to guide the stem and allow liquid to flow past the flange through the openings 50 when the poppet head is unseated as shown in Fig. 3. The outer end of the stem 56 also has a pair of continuous axially spaced guide flanges 61 and 62 which form a groove to receive a sealing ring 63 to prevent leakage through the sleeve 45. The valve member 56 is urged bodily toward and into engagement with the cam 26 by means of a spring 64 bearing against the flange 62 and the inside of the closure cap 54. A hole 56a through valve 56 balances the poppet and makes a strong spring unnecessary.

As shown in Fig. 3, the valve head 58 is displaced from the seat 59. When, however, the shaft 22 is rotated, the lobe on the cam 26 will displace the valve head 58 upwardly into engagement with the seat 59. Inasmuch as the cam, the valve head and the sleeve 45 cannot be machined to such close tolerances that the valve will lightly engage the seat when it is on the crest of the cam 26, the latter will usually be made so that it will have a higher lift than that required to seat the valve head 58 against the valve seat 59. Due to the yielding mounting of the valve sleeve 45, it can retract slightly, as shown in valve unit 42, when the valve head comes in contact with the valve seat so that a light but sealing engagement can be obtained therebetween, depending upon the strength of the spring 53.

In order to prevent the sleeve 45 from following the valve head 58 as the latter moves to its open position, the bore 38 is provided with a shoulder 65 which limits the inward travel of the sleeve 45 to enable the valve unit to open to a predetermined extent.

The other valve units 42, 43 and 44 are like the valve 41 described above. The valve 42, as shown, is associated with the cam 26 so that the valve 42 is closed when the valve 41 is open and the valve 41 is closed when the valve 42 is open. In an intermediate position of the cam, both of the valves 41 and 42 are closed.

Similarly, the valves 43 and 44 are alternately opened and closed by rotation of the cam shaft 22 and the cam 27 thereon and both can be closed simultaneously in the intermediate position of the cam shaft 22. The arrangement of the cams 26 and 27 on the shaft 22 is such that the valves 41 and 44 are open when the valves 42 and 43 are closed, as shown in Figs. 2 and 3. Likewise, the valves 41 and 44 are closed when the valves 42 and 43 are open.

The connections between the pressure port 33 and the return port 34 and the respective chambers 31 and 32 has been described. The connection port 39 is so arranged that it communicates with the recess 52 of the valve 41 and with the corresponding recess 52' of the valve 43 through a cross bore 66. The connection port 40 is connected by means of a transverse bore 67 with the recess 52" of the valve 42 and the corresponding recess 52''' of the valve 44. With this arrangement of passages, when the cam shaft is rotated to open the valve 41 and the valve 44, liquid will flow under pressure through the pressure port 33 into the chamber 31, through the open valve 41 into the recess 52, the bore 66 and the connection port 39 to the hydraulic motor, not shown. Liquid returning from the hydraulic motor flows in through the connection port 40, the bore 67, the recess 52''', the open valve 44 into the chamber 32 and through the bores 35, 36 and the return port 34 to the intake side of the pump or the reservoir supplying the pump.

If the cam shaft 23 is rotated to open the valve 42, the corresponding return control valve 43 likewise is opened. The flow then takes place through the pressure port 33, the chamber 31, the valve 42, recess 52", bore 67, the connection port 40 and to the hydraulic motor. Fluid returning from the hydraulic motor flows in through the port 39, the passage 66, the recess 52', the open valve 43 into the chamber 32 and from the chamber 32 to the return port 34 thereby reversing the direction of flow through the motor.

The above-described valve unit has the advantages over the prior valves of making it unnecessary to provide passages through the valve member and around the outside of the valve sleeve to permit flow of liquid from the cam shaft-receiving bore to the outer ends of the sleeves as was done heretofore. The new valve, therefore, eliminates several difficult machining operations and provides a more compact arrangement because space need not be provided for the passages referred to above. The sliding mounts for the valve seats also overcome the need for machining the cams, the valve seats and the poppet head to close tolerances because the yielding nature of the seats compensates for variations in the size of these elements.

The above-described valve also admits of many different arrangements of the component parts thereof, for example, the bores for receiving the valve units may be arranged parallel with each other rather than at right angles and the porting of the valves and the cam actuating mechanism may be modified widely. For example, a sliding cam instead of a rotating cam may be used, if desired.

It will be understood that the valve may be provided with a mechanism of conventional type, if desired, to hold the cam shaft in its neutral or intermediate position and in each of its operating positions.

From the preceding description, it will be understood that the valve is susceptible to considerable modification and that the form of the invention described above is illustrative and should not be considered as limiting the scope of the following claims

We claim:

1. A valve comprising a casing having a bore therein and a pair of ports communicating with said bore in spaced relation, a sleeve slidable lengthwise of said bore and having a valve seat at one end interposed between said ports, a valve member reciprocable axially of said sleeve and having a valve head movable into and out of engagement with said seat, actuating means adjacent to the valve head to move it into engagement with said seat and displace said sleeve axially along said bore, means biasing said valve head away from said seat and toward said actuating means, means yieldingly resisting displacement of said seat by said valve head and enabling the seat to move with said valve head upon engagement therewith, and means limiting movement of said seat toward said valve head to enable the valve head to move away from said seat.

2. A valve comprising a casing having a bore therein, and a pair of ports communicating with said bore at zones spaced apart lengthwise of said bore, a sleeve slidably mounted in said bore and having a valve seat therein interposed between said zones, a valve member substantially coaxial with said sleeve and having a valve head movable into and out of engagement with said seat, actuating means to move said valve head into engagement with said seat and displace said sleeve axially along said bore, means biasing said valve head toward said actuating means and away from said seat, means yieldingly resisting displacement of said sleeve by said head and enabling said seat to be moved by engagement with said head, means normally urging said valve head away from said seat and toward said actuating means, and means limiting movement of said sleeve toward said actuating means to enable said head to move out of engagement with said seat.

3. A valve comprising a casing having a pair of intersecting bores therein in substantially right angular relation, a cam shaft movably mounted in one of said bores, a sleeve slidably mounted in the other bore and having an inner end forming a valve seat, a valve member substantially coaxial with said sleeve and having a head engageable with said seat said head being movable toward said seat by movement of said cam shaft to engage said seat and displace said sleeve axially, means urging said valve member toward said cam shaft and away from said seat, stop means limiting movement of said sleeve toward said cam shaft to enable said head to move away from said seat, and means biasing said sleeve toward said stop means and resiliently opposing axial movement of said sleeve away from said stop means upon engagement of said sleeve by said valve head.

4. A valve comprising a casing having first and second bores therein intersecting in substantially right angular relation, a first port in said casing communicating with said first bore, a second port in said casing communicating with about the mid-portion of the second bore, a sleeve slidably mounted for movement lengthwise of said second bore and having a valve seat at the end adjacent to said first bore and an opening therethrough behind the seat communicating with said second port, a valve member movable substantially axially of said sleeve and having a valve head adjacent to said first bore, a camming member in said first bore engageable with said valve head and movable to move said valve head into engagement with said seat, means yieldingly urging said sleeve toward said camming members, means in said second bore to limit movement of said sleeve toward said camming member, and means urging said valve member toward said camming member.

5. The valve set forth in claim 4 comprising sealing means interposed between said sleeve and said casing on opposite sides of the opening in said sleeve to preclude leakage between the sleeve and the casing.

6. A selector valve comprising a casing having a first centrally located bore, a second bore intersecting said first bore in right substantially angular relation thereto, a third bore intersecting said first bore in substantially right angular relation to said first and second bores and in spaced relation to the latter, an actuating member movably mounted in said first bore, sleeves movable axially in said second and third bores on opposite sides of said first bore, said sleeves being biased toward said first bore and having valve seats thereon adjacent to said first bore, a valve member substantially coaxial with each sleeve and having a valve head adjacent to the actuating member movable into and out of engagement with a corresponding valve seat, said actuating member being movable to move said valve heads selectively into engagement with their corresponding valve seats, means biasing said valve members toward said actuating member and out of engagement with their corresponding seats, and means limiting movement of said sleeves toward said actuating member to enable said valve heads to move out of engagement with their corresponding seats.

7. The selector valve set forth in claim 6 comprising ports in said casing communicating with said bores on opposite sides of said valve seats for flow of fluid through the valve under the control of said actuating member.

References Cited in the file of this patent

UNITED STATES PATENTS

| Number | Name | Date |
|---|---|---|
| 1,303,145 | Anthony | May 6, 1919 |
| 2,621,936 | Trevaskis | Dec. 16, 1952 |

FOREIGN PATENTS

| Number | Country | Date |
|---|---|---|
| 692,383 | Germany | 1940 |
| 991,293 | France | 1951 |